United States Patent Office 2,723,938
Patented Nov. 15, 1955

2,723,938

AQUEOUS PENICILLIN SUSPENSIONS COMPRISING INOSITOL PHOSPHORIC ACIDS AND THEIR SALTS

Frank Harold Buckwalter, De Witt, and Murray A. Kaplan, Syracuse, N. Y., assignors to Bristol Laboratories Inc., Syracuse, N. Y., a corporation of New York No Drawing. Application December 5, 1952, Serial No. 324,419

15 Claims. (Cl. 167—65)

This invention relates to improved aqueous penicillin suspensions and, more particularly, to aqueous penicillin suspensions containing inositolphosphoric acids or non-toxic salts thereof.

The use in medicine by injection or orally of aqueous suspensions of insoluble salts of penicillin is well-known. During the time such preparations have been available, difficulty has been encountered in providing preparations which will not upon storage settle or clump and which are easily restored to a state of complete dispersion free from lumps. The only suitable means to accomplish this which is available to the physician at the bedside is manual shaking. It is the object of this invention to provide a non-toxic, inexpensive means for insuring that brief simple manual shaking will restore to a state of complete and uniform dispersion these useful aqueous suspensions of insoluble penicillin salts even after prolonged storage. It is a further object of this invention to provide aqueous penicillin suspensions of improved pharmaceutical elegance by comparison with those presently available.

The objects of this invention have been attained by the discovery according to the present invention of an aqueous suspension comprising a water-insoluble therapeutic salt of penicillin and a member selected from the group consisting of inositolphosphoric acids and their non-toxic salts.

Inositol, cyclohexane-hexol, $C_6H_6(OH)_6$ can occur theoretically in seven inactive forms, two optically active forms and one racemic form, which differ in the relative positions of the hydroxyl groups, one of which is attached to each carbon atoms. Both optically active forms and the racemic form are known with certainty together with several inactive forms. Inositolhexaphosphoric acid ($C_6H_{18}O_{24}P_6$) is known as phytic acid; together with its salts, phytic acid has been isolated from natural sources, e. g. corn steep liquor, converted into various salts, e. g. iron, copper, calcium, magnesium, manganese, sodium, potassium, and ammonium, and converted into inositol and other inositolphosphoric acids such as inositoltriphosphoric acid and inositoltetraphosphoric acid. All of these phosphorylated inositols and their non-toxic salts are useful in the present invention; I prefer to use about 0.1 to 2.0 percent sodium phytate. Mixtures are also found useful. The non-toxic, water-soluble salts are preferred. Phytic acid and its salts have been used to sequester copper, manganese and iron, to make dried fruit juices non-hygroscopic, to inhibit oxidation of mercaptans in the presence of certain metals, to prevent the formation of scale by hard water, in the paper-making industry and, by oral administration in man of the calcium-magnesium salt, to provide a source of calcium and organic phosphorus as a dietary supplement.

Further understanding of the invention may be obtained by reference to the following examples which are illustrative only and are not the exclusive embodiment of the invention.

Example 1

The following vehicles were prepared by mixing the ingredients, adjusting the pH where noted, autoclaving at 15 pounds for fifteen minutes, stirring down to room temperature and adjusting the volume with distilled water.

| Materials | Vehicle Numbers |||||||||
|---|---|---|---|---|---|---|---|---|---|
| | 1 | 2 | 3 | 4 | 5 | 6 | 7 | 8 | 9 |
| Lecithin, grams | | | 3.5 | | | 2.1 | 2.1 | 2.1 | 2.1 |
| Tween 40, grams | | 4.65 | 4.65 | | 2.79 | 2.79 | 2.79 | 2.79 | 2.79 |
| Span 40, grams | | 1.65 | 1.65 | | 0.99 | 0.99 | 0.99 | 0.99 | 0.99 |
| Sodium Citrate USP, grams | 2.85 | 2.85 | 2.85 | 1.71 | 1.71 | 1.71 | 1.71 | 1.71 | 1.71 |
| Butyl Paraben, g | 0.105 | 0.105 | 0.105 | 0.063 | 0.063 | 0.063 | 0.063 | 0.063 | 0.063 |
| Sodium Phytate, g | 5.0 | 5.0 | 5.0 | 3.0 | 3.0 | 3.0 | | | |
| 1 N HCl, cc | | | | 11.6 | 11.0 | 11.7 | | | |
| 1 N NaOH, cc | | | | 0.45 | 0.3 | 1.6 | | | |
| pH before autoclaving | 10.5 | 10.0 | 9.9 | 7.0 | 7.0 | 7.0 | (¹) | (¹) | (¹) |
| pH after autoclaving | 10.05 | 9.8 | 9.5 | 6.9 | 6.95 | 7.0 | (¹) | (¹) | (¹) |
| Distilled Water q. s. ad, cc | 500 | 500 | 500 | 300 | 300 | 300 | 300 | 300 | 300 |

¹ Not measured. pH after mixing of vehicles with penicillin and procain hydrochloride was about 6.0 to 7.5.

Each vehicle in the amount of about 173–182 cc. was added (q. s. ad. 250 cc.) to a mixture of lecithin-coated, micronized procaine penicillin G (60.375 g.), lecithin-coated, pulverized procaine penicillin G (20.125 g.), and procaine hydrochloride (0.0 g.), thoroughly mixed and the final mixture given the same number as the vehicle.

The above samples were filled into 10 cc. silicone-coated vials, stored for two months at 37° C. and examined with the following tabulated results.

| Preparation Number | Fraction Appearing as a Clear Liquid as Percent | Fraction of Solid Material Left Hanging From Top When Vial is Inverted Once | Time Required For Complete Resuspension by Gentle, Manual Shaking in Seconds | Time Required in seconds after Inversion for Suspension to First Begin to Break away from Walls at Top and then to Drain Completely to Top of Main Body of Suspension | | Appearance | Percentage Loss of Activity Upon Assay |
|---|---|---|---|---|---|---|---|
| | | | | To Break | To Drain | | |
| 1 | none | none (slid off) | 2 or less | 1 | 2 | white fluid | 0 |
| 2 | 10 | do | 1 | 1 | 2 | do | 0 |
| 3 | 10 | do | 1 | 1 | 2 | do | 0 |
| 4 | 15 | do¹ | 1 (2 shakes) | 1 | 2 | do | 4 |
| 5 | 20 | do¹ | 2 | 3 | 5 | white slightly thick | 0 |
| 6 | 33 | do¹ | 1 | 2 | 3 | white fluid | 5 |
| 7 | 50 | all | 10 | 2 | >15 | yellow | 15.1 |
| 8 | 33 | do | 10 | >15 | >15 | do | 15.2 |
| 9 | 50 | do | 10 | >15 | >15 | do | 18.5 |

¹ Slid down as a cake which instantaneously dispersed.

*Example II*

Under sterile conditions 5.0 grams of anhydrous sodium citrate, 0.5 gram of sodium carboxymethylcellulose and 0.35 gram of sodium phytate are added to 50 cc. of water and stirred with a laboratory agitator until solution is complete. 25 cc. of this solution are added to a 100 cc. beaker and 16.5 grams of procaine penicillin G (potency about 1000 units/milligram; screened through a 200 mesh screen) added. The volume is adjusted to 50 cc. with the citrate-carboxymethylcellulose-phytate solution and the suspension is thoroughly mixed. The pH of the suspension is adjusted to 6.5 with citric acid. The suspension upon long storage, as at 37° C., exhibits improved ease of resuspension and increased pharmaceutical elegance in comparison with a duplicate product which lacks any sodium phytate.

*Example III*

A formulation is prepared as a duplicate of number 4 in Example I, with the omission of the procaine hydrochloride. This suspension upon storage exhibits improved ease of resuspension and increased pharmaceutical elegance in comparison with a duplicate product which lacks any sodium phytate.

As a water-insoluble therapeutic salt of penicillin I prefer to use procaine benzylpenicillin but can also successfully use l-ephenamine penicillin, N,N'-dibenzylethylenediamine dipenicillin, dehydroabietylamine penicillin and the like. With such an amine salt of penicillin I may, but need not, use from 0.5 to 5.0 percent, and preferably 2.0 percent, of a water-soluble, ionized, injectable salt of the amine which is combined with the penicillin, e. g. procaine in the preferred example, in the form of the free base, the phosphate, the acetate, the hydrochloride, the citrate or the like.

If desired, a buffering agent may be added, such as 0.25 to 5.0 percent by weight, and preferably 0.5 percent, of sodium citrate or 1.0 to 7.5 percent sodium phosphates and preferably 2.6 percent sodium dihydrogen phosphate and 2.4 percent disodium hydrogen phosphate to make a total of five percent by weight of the total composition. When appropriate, as in the presence of excess added procaine free base, the suspension may be buffered by the addition of free acids, e. g. citric acid, phosphoric acid. The use of the buffering agent is not essential, however, to either the stability or the therapeutic effectiveness of the compositions of the present invention.

If desired, suspending or dispersing agents may be added to increase pharmaceutical elegance. As as suspending or dispersing agent, sodium carboxymethylcellulose has been found highly satisfactory but carboxymethylcellulose, methylcellulose, polyvinyl alcohol, polyvinylpyrrolidone, gum tragacanth, gelatin, pectin, sodium alginates, dextran, gum Karaya, and the like, are also useful. The amount of suspending agent will vary to a certain extent, but usually from about 0.2 to 5.0 percent, preferably from 0.5 to 2.5 percent, is employed and variations within these ranges may be made by any experienced chemist or pharmacist with regard to the intended use of the composition. Thus the concentration of polyvinylpyrrolidone may vary from 0.1% to 25%, with about 10% preferred. The concentration of dextran may vary from 0.1% to 20%, with about 10% preferred. The concentration of pectin may vary from 0.1% to 0.5%, with about 0.2% preferred. The concentration of gum tragacanth may vary from 0.5% to 2% with about 1% preferred; 5% sodium chloride may be added thereto.

It is to be understood that the words "suspending agent" and "dispersing agent" are used interchangeably to describe the additives such as sodium carboxymethylcellulose, lecithin, Spans and Tweens which improve the pharmaceutical elegance of these preparations, as by increasing ease of injection and ease of resuspension upon settling. Other suspending and dispersing agents include lecithin, Falba, cholesterol, Span 20, Span 40, Span 60, Span 80, the Tweens, Amerchols, sodium alginate, potassium alginate, ammonium alginate, calcium alginate, alginic acid, propylene glycol alginate, polyoxyalkylene derivatives of sorbitol fatty acid esters, urea and sodium p-aminobenzoate.

The procaine penicillin G suspension may have a potency of anywhere from 10,000 to about 600,000 units per milliliter, preferably from about 100,000 to 400,000 units per milliliter. Ordinarily, a suspension of procaine penicillin G having a potency of about 300,000 units per milliliter is optimum, and found to be entirely satisfactory. The potency of the procaine penicillin G is not to be construed as a limiting factor, and the various activities are merely mentioned to indicate that procaine penicillin G of various activities is suitable for incorporation into the composition of the present invention, again with regard for the intended application of the aqueous suspension.

The composition is not limited to the exact ingredients previously described and to the exclusion of all others, since various other ingredients, while not necessary, may be added, if desired. For instance, a small amount of preservative, such as Phenol U. S. P., Cresol U. S. P., Methyl Paraben (methyl ester of p-hydroxybenzoic acid), Ethyl Paraben (ethyl ester of p-hydroxybenzoic acid), Butyl Paraben (butyl ester of p-hydroxybenzoic acid) or Propyl Paraben (propyl ester of p-hydroxybenzoic acid) may be employed. A small quantity of a vasoconstrictor may also be considered an advantageous addition, and, whatever additional ingredients are employed, the total amount should ordinarily not exceed more than about ten percent by weight, and preferably not more than five percent by weight, of the total composition. Other ingredients which improve blood levels, handling properties and stability may be added. Examples of such ingredients are lecithin, Falba, cholesterol, Span 20, Span 40, Span 60, Span 80, Tween 20, Tween 40, Tween 60, Tween 80, Tween 85, Amerchols, urea and sodium para-aminobenzoate.

While the present invention has been described with particular reference to procaine penicillin G, it is to be understood that the procaine salts of other penicillins are also included within the scope of this invention. For instance, the penicillins G, F, X, O, dihydro F and K, and mixtures of two or more such penicillins, particularly mixtures containing at least 85% penicillin G, are included within the scope of this invention.

The preparations of the present invention exhibit good stability upon storage and upon injection produce satisfactory blood levels in man.

It will be understood that, without departing from the spirit of the invention or the scope of the claims, various modifications may be made in the specific expedients described. The latter are illustrative only and are not offered in a restrictive sense, and there is no intention of excluding any equivalents of the features shown and described or portions thereof.

We claim:

1. An aqueous suspension comprising a water-insoluble therapeutic salt of penicillin and a member selected from the group consisting of inositolphosphoric acids and their non-toxic salts.

2. An aqueous suspension comprising procaine benzylpenicillin and a member selected from the group consisting of inositolphosphoric acids and their non-toxic salts.

3. An aqueous suspension comprising 1-ephenamine benzylpenicillin and a member selected from the group consisting of inositolphosphoric acids and their non-toxic salts.

4. An aqueous suspension comprising N,N'-dibenzylethylenediamine dibenzylpenicillin and a member selected from the group consisting of inositolphosphoric acids and their non-toxic salts.

5. An aqueous suspension comprising dehydroabietylamine benzylpenicillin and a member selected from the group consisting of inositolphosphoric acids and their non-toxic salts.

6. An aqueous suspension comprising procaine benzylpenicillin and sodium phytate.

7. An aqueous suspension comprising procaine benzylpenicillin and from 0.1 to 2.0 percent of sodium phytate.

8. An aqueous suspension comprising procaine benzylpenicillin and about 0.7 percent of sodium phytate.

9. An aqueous suspension comprising a water-insoluble therapeutic salt of penicillin and a member selected from the group consisting of inositolphosphoric acids and their non-toxic salts and a suspending agent.

10. An aqueous suspension comprising procaine benzylpenicillin and a member selected from the group consisting of inositolphosphoric acids and their non-toxic salts and a suspending agent.

11. An aqueous suspension comprising procaine benzylpenicillin and sodium phytate and a suspending agent.

12. An aqueous suspension comprising procaine benzylpenicillin and from 0.1 to 2.0 percent of sodium phytate and a suspending agent.

13. An aqueous suspension comprising 1-ephenamine benzylpenicillin and sodium phytate.

14. An aqueous suspension comprising 1-ephenamine benzylpenicillin and from 0.1 to 2.0 percent of sodium phytate.

15. An aqueous suspension comprising 1-ephenamine benzylpenicillin and about 1.0 percent sodium phytate.

References Cited in the file of this patent

UNITED STATES PATENTS

| | | |
|---|---|---|
| 2,239,543 | Andrews | Apr. 22, 1941 |
| 2,353,166 | Lanz | July 11, 1944 |
| 2,627,491 | Szabo | Feb. 3, 1953 |
| 2,637,679 | Gaunt | May 5, 1953 |

OTHER REFERENCES

Bachman et al.: "Duration of Therapeutic Plasma Penicillin Levels With the Penicillin Salt of 1,2-diphenyl-2-methylaminoethanol," Fed. Proc. Pharmacology and Experimental Therapeutics, March 1951, p. 277.